(12) United States Patent
Takeishi et al.

(10) Patent No.: US 9,863,393 B2
(45) Date of Patent: Jan. 9, 2018

(54) WASTE HEAT CONTROLLER

(75) Inventors: Hiroaki Takeishi, Obu (JP); Takashi Senda, Niwa-gun (JP); Mitsuo Hara, Ichinomiya (JP); Takanobu Kawano, Obu (JP)

(73) Assignee: DENSO CORPORATION, Kariya (JP)

(*) Notice: Subject to any disclaimer, the term of this patent is extended or adjusted under 35 U.S.C. 154(b) by 1153 days.

(21) Appl. No.: 13/027,577

(22) Filed: Feb. 15, 2011

(65) Prior Publication Data

US 2011/0197853 A1 Aug. 18, 2011

(30) Foreign Application Priority Data

Feb. 15, 2010 (JP) .................................. 2010-30450

(51) Int. Cl.
F02P 5/00 (2006.01)
F02P 5/04 (2006.01)
(Continued)

(52) U.S. Cl.
CPC .................. F02P 5/04 (2013.01); B60H 1/08 (2013.01); F01N 5/02 (2013.01); F02D 13/0215 (2013.01); F02D 13/0261 (2013.01); F02D 13/0269 (2013.01); F02D 15/00 (2013.01); F02G 5/02 (2013.01); F01P 2060/08 (2013.01); F01P 2060/16 (2013.01); F02M 26/15 (2016.02);
(Continued)

(58) Field of Classification Search
USPC ............. 123/320–322, 329, 345–348, 90.11, 123/90.15, 406.18, 406.19, 406.24, 123/406.25, 406.44, 406.45, 406.46, 123/406.5, 406.55, 672, 676; 701/103, 701/105, 110, 115
See application file for complete search history.

(56) References Cited

U.S. PATENT DOCUMENTS 1,903,803 A * 4/1933 Barker .......................... 502/324
4,009,695 A * 3/1977 Ule ............................. 123/90.13
(Continued)

FOREIGN PATENT DOCUMENTS

DE 103 06 457 8/2004
DE 10 2004 041 607 3/2005
(Continued)

OTHER PUBLICATIONS

U.S. Appl. No. 12/753,346, filed Apr. 2, 2010, Takeish et al.
(Continued)

*Primary Examiner* — Hai Huynh
*Assistant Examiner* — Gonzalo Laguarda
(74) *Attorney, Agent, or Firm* — Nixon & Vanderhye P.C.

(57) ABSTRACT

An ECU controls waste heat quantity of an engine according to a required heat quantity in response to a heat-utilize requirement. The ECU controls a valve opening period of an intake valve based on an engine driving condition and an ignition timing based on a most efficient timing at which fuel economy is highest. The ECU determines whether there is an ignition advance margin relative to the most efficient timing. When there is no margin, an actual compression ration of the engine is decreased by advancing or retarding a valve close timing of the intake valve and the ignition timing is advanced relative to the most efficient timing in order to increase the waste heat quantity.

5 Claims, 3 Drawing Sheets

(51) Int. Cl.
*F01N 5/02* (2006.01)
*F02D 13/02* (2006.01)
*F02D 15/00* (2006.01)
*F02G 5/02* (2006.01)
*B60H 1/08* (2006.01)
*F02M 26/15* (2016.01)

(52) U.S. Cl.
CPC .............. *Y02T 10/142* (2013.01); *Y02T 10/16* (2013.01); *Y02T 10/166* (2013.01)

(56) References Cited

U.S. PATENT DOCUMENTS

| | | | |
|---|---|---|---|
| 6,334,431 | B1 | 1/2002 | Kanchiro et al. |
| 7,278,383 | B2 * | 10/2007 | Kamiyama et al. ......... 123/48 C |
| 7,287,521 | B2 * | 10/2007 | Yang ............................. 123/556 |
| 7,950,368 | B2 * | 5/2011 | Pursifull et al. ......... 123/406.53 |
| 8,033,098 | B2 * | 10/2011 | Tateno ........................... 60/285 |
| 2004/0055283 | A1 | 3/2004 | Iihoshi et al. |
| 2005/0056242 | A1 | 3/2005 | Murata et al. |
| 2010/0251703 | A1 * | 10/2010 | Takeishi et al. ................ 60/320 |
| 2011/0004392 | A1 | 1/2011 | Senda et al. |

FOREIGN PATENT DOCUMENTS

| | | |
|---|---|---|
| JP | 2-96476 | 8/1990 |
| JP | 6-330776 | 11/1994 |
| JP | 2909219 | 4/1999 |

OTHER PUBLICATIONS

U.S. Appl. No. 12/814,681, filed Jun. 14, 2010, Senda et al.
Office Action (2 pages) dated Apr. 9, 2013, issued in corresponding Japanese Application No. 2010-030450 and English translation (2 pages).

* cited by examiner

WASTE HEAT CONTROLLER

CROSS-REFERENCE TO RELATED APPLICATION

This application is based on Japanese Patent Application No. 2010-30450 filed on Feb. 15, 2010, the disclosure of which is incorporated herein by reference.

FIELD OF THE INVENTION

The present invention relates to a waste heat controller which controls waste heat quantity of an engine in accordance with a heat-utilize requirement.

BACKGROUND OF THE INVENTION

In an internal combustion engine for a vehicle, the combustion energy includes kinetic energy and heat energy. This heat energy is utilized for warming an interior of the vehicle and a catalyst. Engine waste heat is recovered through engine coolant.

JP-U-02-96476A and Japanese Patent No. 2909219, for example, describe that an ignition timing and valve timings of intake/exhaust valves are controlled to increase the engine waste heat quantity, whereby a warming-up of the engine and the catalyst is accelerated.

If the ignition timing and/or the valve timing is varied in order to increase the engine waste heat quantity without respect to an engine driving condition, it is likely that a brake thermal efficiency may be excessively deteriorated due to an increase in the engine waste heat. That is, an engine operating region in which the engine waste heat is efficiently utilized is restricted to a specified engine operating region. If a current engine driving condition is out of the specified engine operating region, the brake thermal efficiency may be largely deteriorated. In the above patent documents, there is no description about restricting deterioration in brake thermal efficiency (deterioration in fuel economy) due to an increase in waste heat.

SUMMARY OF THE INVENTION

The present invention is made in view of the above matters, and it is an object of the present invention to provide a waste heat controller which is able to control an engine waste heat quantity in response to a heat-utilize requirement while restricting deterioration in a brake thermal efficiency.

According to the present invention, a waste heat controller controls a waste heat quantity of an engine based on a required heat quantity in response to a heat-utilize requirement. The waste heat controller includes:

an intake valve control means for controlling an opening period of an intake valve of the engine based on an engine driving condition;

an ignition control means for controlling an ignition timing of the engine based on a most efficient timing at which a highest brake thermal efficiency is obtained in a current engine driving condition;

a margin determination means for determining whether there is an ignition advance margin relative to the most efficient timing; and a waste heat control means for executing both an actual compression ratio decreasing control in which an actual compression ration of the engine is decreased by advancing or retarding a valve close timing of the intake valve by the intake valve control means and an ignition timing advance control in which the ignition timing is advanced relative to the most efficient timing by the ignition control means in order to increase the waste heat quantity, when the margin determination means determines that there is no ignition advance margin relative to the most efficient timing.

Generally, when a required waste heat quantity is increased in response to a heat-utilize requirement, an ignition timing is advanced more than the most efficient timing in view of restricting a deterioration in fuel economy. Meanwhile, depending on an engine driving condition, it is likely that the ignition timing can not be advanced more than the most efficient timing due to an occurrence of knocking. In such a case, the engine waste heat quantity can not be increased by advancing the ignition timing without deteriorating a fuel economy.

According to the present invention, when there is no ignition advance margin relative to the most efficient timing, a valve close timing of the intake valve is advanced or retarded relative to the intake bottom dead center. The actual compression ratio of the engine is decreased, so that the ignition advance margin can be ensured with a knocking restricted. Thus, the ignition timing can be more advanced relative to the most efficient timing. Also, a deterioration in brake thermal efficiency due to the waste heat control can be restricted as much as possible.

In a case that the intake valve close timing is advanced relative to the intake bottom dead center, the actual compression ratio is decreased to improve the antiknock property. Further, the intake air is expanded after the intake valve is closed and the cylinder temperature during the compression stroke is decreased. Thereby, an occurrence of knocking can be restricted.

According to another aspect of the present invention, the actual compression ratio decreasing control is a control in which the valve close timing of the intake valve is retarded to decrease the actual compression ratio. The waste heat controller further includes a valve overlap control means for controlling a valve overlap period during which a valve opening period of the intake valve and a valve opening period of the exhaust valve overlap with each other. In a case that the valve overlap period is increased by varying a valve opening period of the intake valve, the margin determination means determines whether there is an ignition advance margin relative to the most efficient timing at a time after the valve overlap period is varied.

In order to increase the engine waste heat quantity, it is conceivable that an overlap period between a valve opening period of the intake valve and a valve opening period of the exhaust valve is increased so that an internal EGR quantity, an actual compression ratio and the expansion ratio are increased. In view of fuel economy, it is preferable to vary the valve opening period of the intake valve in order to increase the valve overlap period. On the other hand, when the valve close timing of the intake valve is advanced to increase the valve overlap period, the valve close timing of the intake valve comes close to the intake top dead center and the actual compression ratio of the engine is increased. Thus, depending on the engine driving condition, it is likely that the high actual compression ratio may cause a deterioration in antiknock property and a sufficient ignition timing advance quantity may not be ensured to obtain the required heat quantity. Therefore, like the above another aspect of the present invention, it is effective that the margin determination means determines whether there is an ignition advance margin in view of a variation in antiknock property at a time after the valve overlap period is varied.

According to another aspect of the present invention, when the margin determination means determines there is no ignition advance margin, the waste heat control means execute a first waste heat increasing control and a second waste heat increasing control. In the first waste heat increasing control, the valve close timing of the intake valve is retarded, the ignition timing is advanced and the valve overlap period is increased by varying a valve opening period of the exhaust valve in order to increase the waste heat quantity. In the second waste heat increasing control, the valve overlap period is increased and the ignition timing is advanced in order to increase the waste heat quantity. According to whether there is an ignition advance margin, it is determined which valve timing is adjusted between the intake valve and the exhaust valve. Thus, when there is the margin, a deterioration in fuel economy is restricted.

On the other hand, when the ignition timing can not be advance any more, a close timing of the intake valve is retarded to decrease the actual compression ratio, whereby the ignition advance margin is ensured. Furthermore, the valve overlap period is adjusted by varying the valve opening period of the exhaust valve. Thus, the waste heat quantity can be increased while the required heat quantity is obtained and the deterioration in fuel economy is restricted as much as possible.

According to another aspect of the present invention, when the margin determination means determines there is no ignition advance margin, the waste heat control means defines a variation quantity in the valve close timing of the intake valve based on the required heat quantity and controls the opening period of the intake valve based on the variation quantity in the valve close timing of the intake valve. The ignition advance margin can be ensured according to the variation quantity in the valve close timing of the intake valve. Consequently, the heat quantity corresponding to the required heat quantity can be generated by advancing the ignition timing.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

Figure 1:
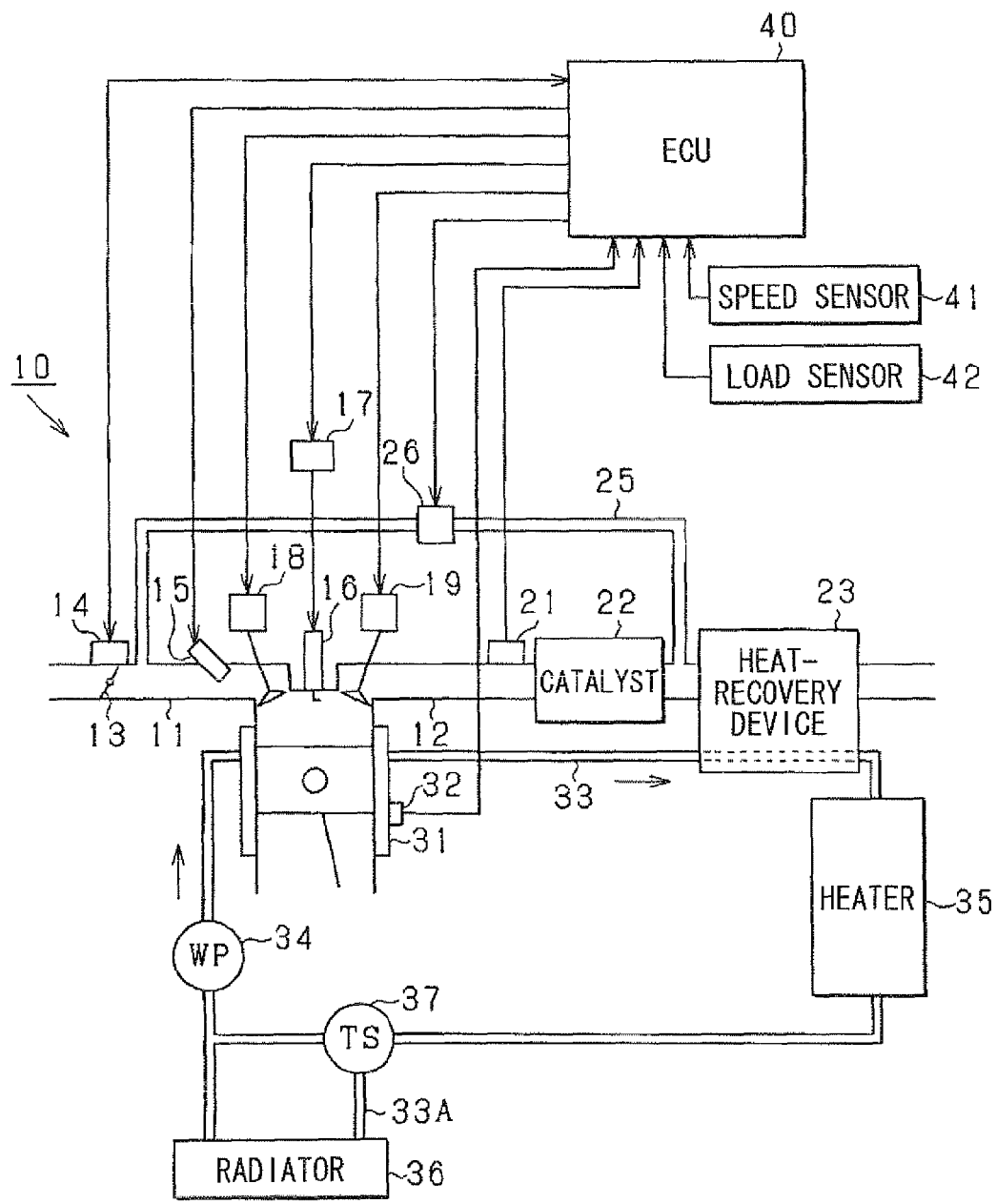
FIG. 1 is a schematic block diagram showing an engine waste heat control system.

Referring to drawings, an embodiment of the present invention will be described, in which the present invention is applied to a multi-cylinder gasoline engine of a spark ignition type. FIG. 1 is a schematic view of a waste heat control system (waste hear reuse system) according to the present embodiment.

An engine 10 is provided with an intake pipe 11 and an exhaust pipe 12. A throttle valve 13 is provided in the intake pipe 11. The throttle valve 13 is driven by an electric throttle actuator 14, such as an electric motor. The throttle actuator 14 is provided with a throttle position sensor (not shown) which detects a position of the throttle valve 13 (throttle opening degree).

The engine 10 is provided with a fuel injector 15, an igniter 17, a spark plug 16, an intake valve timing controller 18 and an exhaust valve timing controller 19. In the present embodiment, the engine 10 is an intake port injection engine in which the injector 15 is arranged at a vicinity of an intake port. The engine 10 can be a direct injection engine in which the injector 15 is mounted to a cylinder head of each cylinder.

The intake valve timing controller 18 advances or retards a valve timing of an intake valve, and the exhaust valve timing controller 19 advances or retards a valve timing of an exhaust valve. By controlling the valve timing of each valve, a valve overlap period in which both valves are opened can be adjusted. In the present embodiment, the valve opening period of each valve is constant. A valve opening timing and a valve closing timing of each valve are variable.

An oxygen concentration sensor 21 detecting an oxygen concentration in exhaust gas is provided to the exhaust pipe 12. A three-way catalyst 22 which purifies the exhaust gas is provided downstream of the oxygen concentration sensor 21. A heat-recovery device 23 is provided in the exhaust pipe 12 downstream of the catalyst 22. The heat-recovery device 23 recovers heat energy from exhaust gas through engine coolant. The recovered heat energy is utilized for warming the interior of the vehicle.

The engine 10 is provided with an exhaust gas recirculation system (EGR system) for recirculating a part of exhaust gas into the intake system. An EGR pipe 25 connects the intake pipe 11 and the exhaust pipe 12. An EGR valve 26 is provided in the EGR pipe 25 to adjust the quantity of exhaust gas recirculating through the EGR pipe 25.

An engine cooling system will be described hereinafter.

An engine coolant flows through a water jacket 31 of the engine 10. A coolant temperature in the water jacket 31 is detected by a coolant temperature sensor 32. An engine coolant pipe 33 is connected to the water jacket 33, and a water pump 34 circulates the coolant in the engine coolant pipe 33. The water pump 34 is an electric pump or a mechanical pump. The water pump may adjust engine coolant quantity circulating in the engine coolant pipe 33.

The engine coolant pipe 33 extends from an outlet of the water jacket 31 to an inlet of the water jacket 31 through the heat-recovery device 23. A heater core 35 is arranged in the engine coolant pipe 33 downstream of the heat-recovery device 23. An air flowing through the heater core 35 receives heat from the heater core 35 to be warmed. The warmed air is introduced into a passenger compartment (interior of the vehicle).

A second coolant pipe 33A is branched from the engine coolant pipe 33. A radiator 36 is arranged in the second coolant pipe 33A. A thermostat 37 is provided at a branch point of the second coolant pipe 33A. When the engine coolant temperature is less than a predetermined value, the thermostat 37 closes the second coolant pipe 33A so that the radiator 36 does not radiate the heat of the engine coolant. When the engine coolant temperature is not less than the predetermined value, the thermostat 37 opens the second coolant pipe 33A so that the radiator 36 radiates the heat of the engine coolant. Thereby, the engine coolant temperature is kept at an appropriate temperature (for example, about 80° C.).

This control system is provided with an electronic control unit (ECU) 40 which executes a various control of the engine 10. The ECU 40 is comprised of a microcomputer including a CPU, a ROM, and a RAM. The ECU 40 executes control programs stored in the ROM to perform various controls according to the engine driving condition. The engine driving condition is detected by an engine speed sensor 41 and engine load sensor 42. The outputs of these sensors 41, 42, the oxygen sensor 21, and the coolant temperature sensor 32 are transmitted to the ECU 40.

The ECU 40 executes a fuel injection control, an ignition timing control, a valve timing control, and an intake air control. Each control is executed based on an adapted data so that a maximum efficiency (highest brake thermal efficiency) of the engine 10 is obtained.

Specifically, the ignition timing is set to a timing which is most close to a minimum advance for best torque (MBT) timing based on the engine speed, the engine load and the like. It should be noted that this ignition timing is not out of a knock limit range.

That is, the most efficient timing (the most optimum ignition timing) at which the brake thermal efficiency is highest is defined as a current ignition timing. The most optimum ignition timing is the MBT timing or the knock limit (trace knock ignition timing) which is more retarded.

In the valve timing control, the valve overlap period is variably set based on the engine speed, the engine load and the like, so that an internal EGR quantity, an actual compression ratio and an expansion ratio can be controlled. Specifically, when the engine load is relatively low, the valve overlap period is increased to perform the internal EGR so that a combustion temperature is lowered and NOx emission is reduced.

In this control system, the heat energy is recovered and reused to improve fuel economy. That is, the ECU 40 executes a waste heat control of the engine 10 based on heat-utilize requirement and current engine driving condition.

Specifically, the ECU 40 has a waste heat controller which adjusts the waste heat quantity of the engine 10. Especially, according to the present embodiment, by adjusting the ignition timing and the valve timing appropriately, the waste heat quantity is generated according to the heat-utilize requirement without deteriorating the fuel economy. The waste heat quantity is increased by advancing the ignition timing relative to the MBT timing and/or increasing the valve overlap period.

According to the present inventors' study, a deterioration in fuel economy is more restricted by advancing the ignition timing than retarding the same. Thus, in the present embodiment, the ignition timing is advanced relative to the MBT timing in order to increase the waste heat quantity.

Figure 2A:
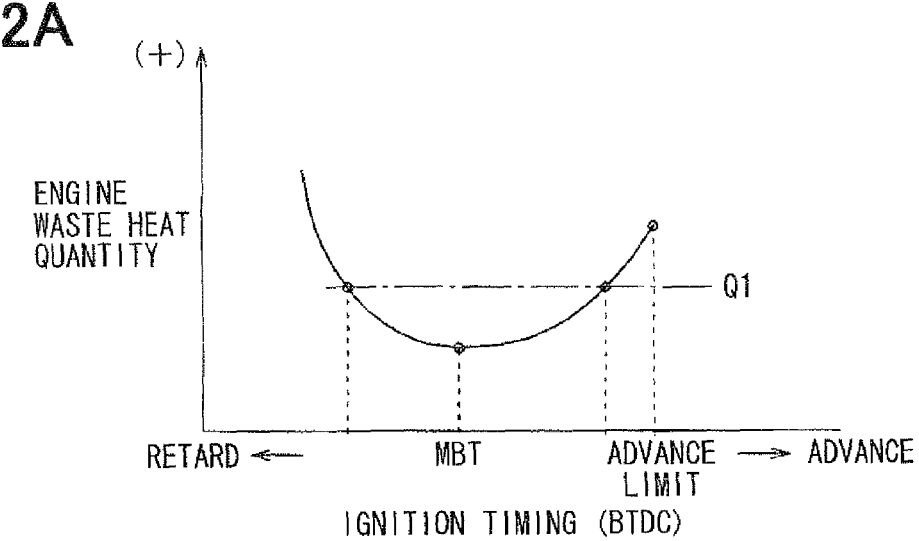
FIGS. 2A and 2B are charts showing an ignition timing characteristic.
Figure 2B:
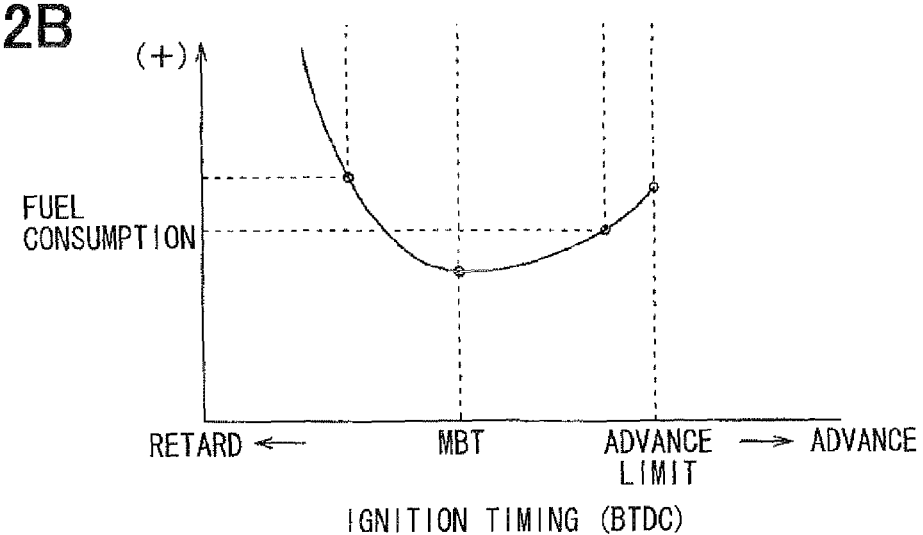

FIGS. 2A and 2B are charts showing an ignition timing characteristic in a case that the valve overlap period is constant and an advance limit of ignition timing is advanced relative to the MBT timing. FIG. 2A shows a relationship between the ignition timing and the engine waste heat quantity and FIG. 2B shows a relationship between the ignition timing and the fuel consumption.

As shown in FIGS. 2A and 2B, when the ignition timing is set to the MBT timing, the fuel consumption and the engine waste heat quantity are minimum. Further, when the ignition timing is advanced or retarded relative to the MBT timing, the engine waste heat quantity and the fuel consumption are accordingly increased. In a case of generating the engine waste heat quantity of specified quantity "Q1", the fuel consumption becomes lower by advancing the ignition timing rather than retarding the same.

However, in a case of increasing the engine waste heat quantity, depending on the current engine driving condition, it may happen that the ignition timing can not be advanced any more relative to the MBT timing. In such a case, the engine waste heat quantity can not be increased by advancing the ignition timing.

According to the present embodiment, the computer determines whether there is a margin to further advance the ignition timing relative to the MBT timing when the engine waste heat quantity is increased. When the computer determines that there is a margin to further advance the ignition timing, an intake timing advance control is executed so that the ignition timing is advanced relative to the MBT timing in order to increase the engine waste heat quantity. On the other hand, when the computer determines that the ignition timing can not be advance any more, a close timing of the intake valve is retarded to execute an actual compression ratio decreasing control and an ignition timing advance control. That is, when there is no ignition advance margin relative to the MBT timing, the opening timing of the intake valve is retarded relative to the intake bottom dead center, whereby the actual compression ratio is decreased and an ignition advance margin is ensured.

With respect to the valve overlap period control for increasing the engine waste heat quantity, it is desirable to vary a valve opening period of the intake valve in view of restricting the deterioration in fuel economy. However, in a case that the valve overlap period is increased by advancing the valve opening period of the intake valve, the intake valve closing timing comes close to the intake bottom dead center and the actual compression ratio of the engine 10 is increased, which may deteriorate antiknock property. Thus, depending on the engine driving condition, it is likely that there is no sufficient ignition advance margin.

In view of the above matters, according to the present embodiment, the computer determines whether there is an ignition advance margin in consideration of the variation in the antiknock property. More specifically, not only in a case that there is no ignition advance margin before the valve overlap period is varied but also in a case there is no ignition advance margin due to a deterioration in the antiknock property, an ignition advance margin is ensured by performing an intake timing retard control.

Furthermore, according to the present embodiment, as a valve overlap period control, an intake timing advance control is executed to advance the valve opening period of the intake valve when the computer determines that there is an ignition advance margin. Meanwhile, when the computer determines there is no more ignition advance margin, an exhaust timing retard control is executed to retard the opening period of the exhaust valve. Thereby, while ensuring an ignition advance margin, the waste heat quantity can be increased by increasing the valve overlap period.

Figure 3:
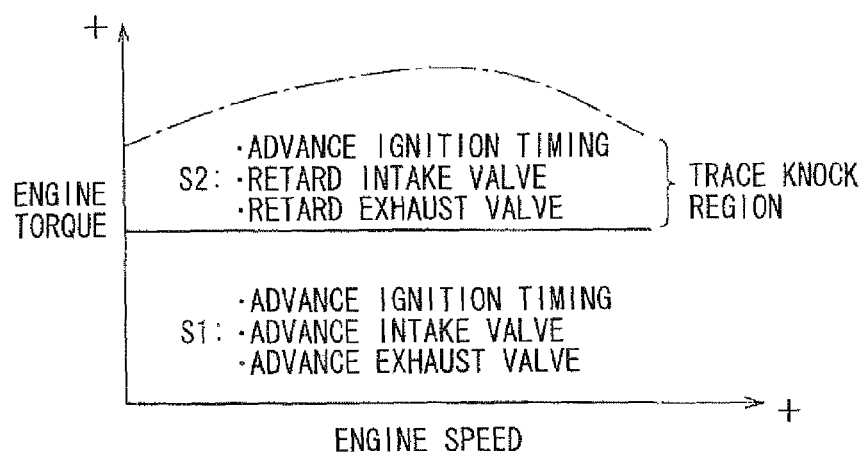
FIG. 3 is a chart for explaining a waste heat control.

Referring to FIG. 3, a waste heat control will be described in detail. An alternate long and short dash line in FIG. 3 represents a maximum torque line. In a low load region S1 where the engine torque is relatively low, the MBT timing exists in retard side relative to the knock limit (trace knock ignition timing). Thus, in the region S1, the engine waste heat quantity can be increased by advancing the ignition timing with respect to the MBT timing. Further, in the region S1, it is less likely that a knocking occurs. Even if the valve overlap period is increased by adjusting a valve timing of the intake valve, it is less likely that the advance of the ignition timing relative to the MBT timing is restricted by the knock limit. Therefore, in the region S1, in order to increase the engine waste heat quantity, a second waste heat increasing control is executed in which at least one of followings is conducted. That is, the ignition timing is advanced relative to the MBT timing, the intake valve opening timing is advanced, or the exhaust valve opening timing is advanced. It should be noted that this second waste heat increasing control is executed when the computer determines that there is an ignition advance margin.

In a high load region S2 where the engine torque is relatively high, the MBT timing exists in advance side relative to the knock limit or the knock limit exists in retard side relative to the MBT timing in a case that the valve overlap period is increased by adjusting the intake valve timing. In such a case, it is conceivable that the ignition timing can not be advanced over the MBT timing. According to the present embodiment, in the region S2, before or after the valve overlap period is varied, a first waste heat increasing control is executed in which at least one of followings is conducted. That is, the ignition timing is advanced relative to the MBT timing and intake valve closing timing is retarded, or the exhaust valve closing timing is retarded.

It should be noted that this first waste heat increasing control is executed when the computer determines that there is no ignition advance margin. When the engine driving condition is varied from the high load region S2 in which there is no margin to the low load region S1 in which there is the margin, the exhaust valve opening timing is advanced at first. Then, the intake valve opening timing is advanced. Thereby, it is restricted that the recirculating exhaust gas (EGR gas) flows into the cylinder through the intake valve and a drivability is deteriorated.

According to the present embodiment, in the region S1, the valve opening timing of the exhaust valve is appropriately advanced to make the combustion condition stable while executing the ignition timing advance control and the intake timing advance control.

Figure 4:
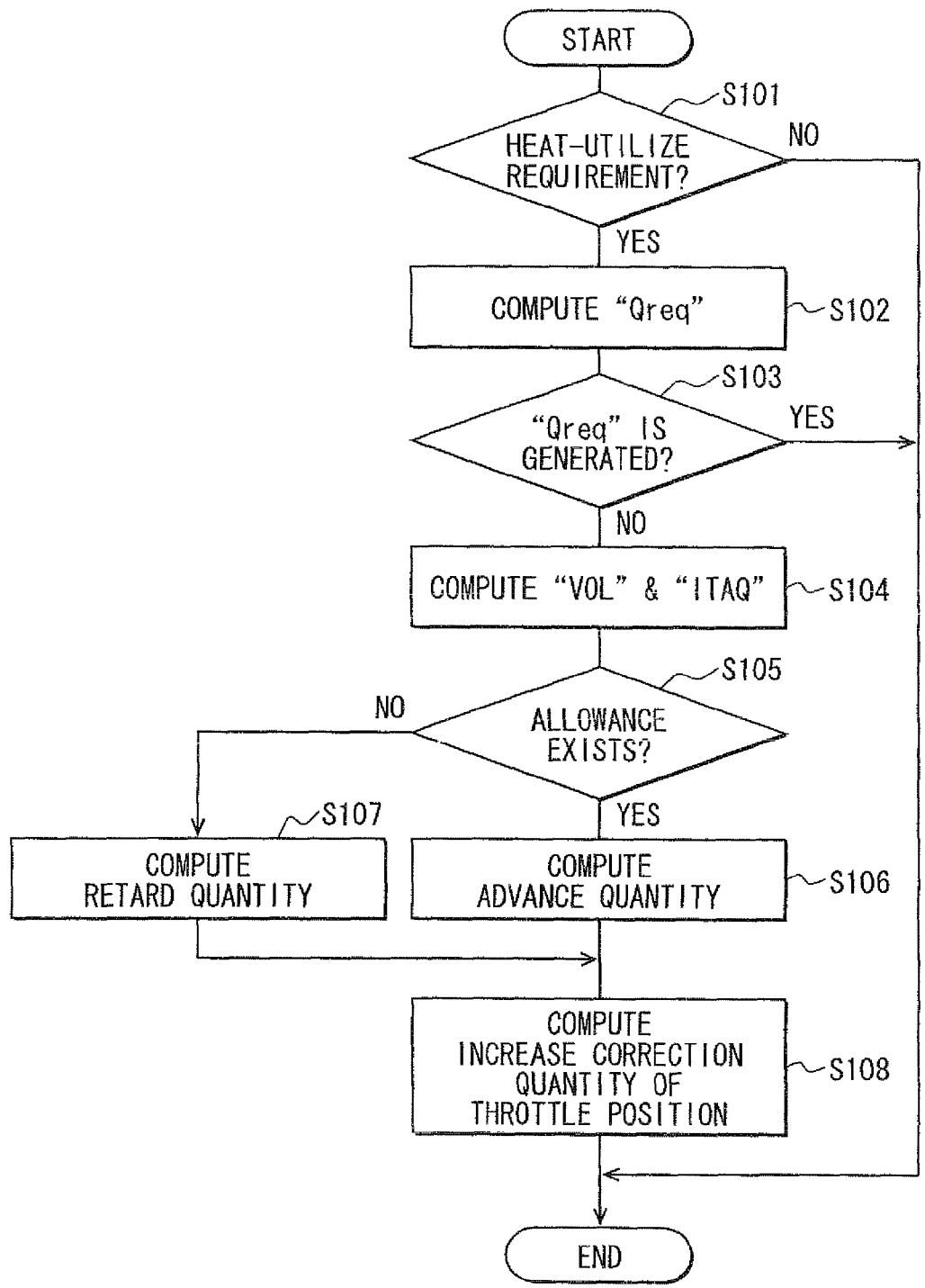
FIG. 4 is a flowchart showing a processing of the waste heat control.

FIG. 4 is a flowchart showing a processing of the waste heat control. This processing is executed at a specified interval by the ECU 40.

In step S101, the computer determines whether a heat-utilize requirement is generated. The heat-utilize requirement includes a heating requirement and a catalyst warming-up requirement. When increasing temperature in a vehicle interior, the heating requirement is generated by passengers. Also, when a temperature of the catalyst 22 in the exhaust pipe 12 is relatively low, the catalyst warming-up requirement is generated. When the answer is YES in step S101, the procedure proceeds to step S102.

In step S102, the computer computes a required waste heat quantity "Qreq" which should be generated according to the heat-utilize requirement. The "Qreq" is computed based on an engine coolant temperature "Tw", an engine coolant quantity, a blower fan speed, an introduced outside air quantity, an outside air temperature, a set temperature, a blowing-out air temperature and the like.

In step S103, the computer determines whether the "Qreq" can be generated under a current engine driving condition. That is, the computer determines whether the engine waste heat quantity should be increased by a waste heat control means. When the answer is YES in step S103, the computer determines that an increase in waste heat quantity is unnecessary to end the procedure. When the answer is NO in step S103, the procedure proceeds to step S104.

In step S104, the valve overlap period "VOL" and an ignition timing advance quantity "ITAQ" are computed based on the engine driving condition and the required heat quantity "Qreq". Specifically, according to the present embodiment, a map defining a relationship between the ignition timing, the "VOL" and the engine waste heat quantity is previously stored with respect to each engine driving condition. Based on this map, the "VOL" and the "ITAQ" are respectively computed.

Based on the "Qreq" and the engine driving condition, the computer determines which control should be executed between the ignition timing advance control and the valve overlap period control. Thereby, a deterioration in brake thermal efficiency is restricted.

In step S105, the computer determines whether there is an ignition advance margin relative to the MBT timing in order to obtain the computed "ITAQ". In a case that the valve timing control is executed based on the computed "VOL", the computer determines whether there is an ignition advance margin relative to the MBT timing while the valve timing control is performed with respect to the intake valve. Specifically, the ignition timing characteristic is defined with respect to each "VOL". This ignition characteristic defines the most advance position (advance limit) with respect to each "VOL". Based on this ignition timing characteristic, the advance limit is defined for varying the valve timing. This advance limit is corrected in view of a deterioration in antiknock property due to a variation in the "VOL". Then, based on the corrected advance limit, the computer determines whether there is an ignition advance margin relative to the MBT timing.

When the answer is YES in step S105, the procedure proceeds to step S106 in which advance quantities of valve opening period of the intake valve and the exhaust valve are respectively computed based on the engine driving condition and the required heat quantity. When the answer is NO in step S105, the procedure proceeds to step S107 in which retard quantities of valve opening period of the intake valve and the exhaust valve are respectively computed based on the engine driving condition and the required heat quantity. It should be noted that the valve timing and the ignition timing are varied based on the computed advance/retard quantity according to another routine (not shown).

Then, the procedure proceeds to step S108 in which an increase correction quantity of the throttle position is computed. This processing is executed for increasing the engine output which has been decreased due to the waste heat control. An increase correction of the intake air flow rate is executed according to another routine (not shown). Then, the processing is terminated.

According to the present embodiment, following advantages can be obtained.

When there is no ignition advance margin relative to the MBT timing for increasing the waste heat quantity, the close timing of the intake valve is retarded with respect to the intake bottom dead center. The actual compression ratio of the engine 10 is decreased and the antiknock property can be improved. Thereby, while ensuring an ignition advance margin, the waste heat quantity can be increased by advancing the ignition timing in response to a heat-utilize requirement. Also, a deterioration in brake thermal efficiency due to the waste heat control can be restricted as much as possible.

Basically, when the required heat quantity is increased, the "VOL" is varied by adjusting a valve timing of the intake valve. Meanwhile, when the "VOL" is varied by adjusting the valve timing of the intake valve, the ignition advance margin becomes insufficient due to a deterioration in antiknock property. In view of this, it is determined whether there is an ignition advance margin. If there is no margin, the actual compression ration is decreased to ensure the margin.

Thus, the waste heat can be optimally increased while restricting a deterioration in fuel economy.

According to whether there is an ignition advance margin, it is determined which valve timing is adjusted between the intake valve and the exhaust valve in order to vary the "VOL". When there is the margin, a deterioration in fuel economy is restricted. When there is no margin, the valve close timing of the intake valve is retarded to decrease the actual compression ratio, whereby the ignition advance margin is ensured. The valve opening period of the exhaust valve is varied to adjust the "VOL". Thereby, the waste heat control can be executed in response to the heat-utilize requirement without deteriorating the fuel economy.

Other Embodiment

The present invention is not limited to the embodiments described above, but may be performed, for example, in the following manner.

In the above embodiment, a retard quantity of intake valve close timing can be set according to a required heat quantity in order to increase the engine waste heat quantity. The actual compression ratio can be decreased as the intake valve close timing is more retarded relative to the intake bottom dead center, so that the "ITAQ" can be made larger. As the "ITAQ" becomes larger, the engine waste heat quantity becomes larger. Thus, according to the required heat quantity, the sufficient engine waste heat can be generated.

In the above embodiment, the intake valve timing controller 18 and the exhaust valve timing controller 19 are provided. Alternatively, only the intake valve timing controller can be provided. In this case, when the second waste heat increasing control is restricted due to the advance limit, that is, when there is no ignition advance margin relative to the MBT timing, the actual compression ration is decreased to ensure the ignition advance margin and the ignition-timing-advance control is executed to increase the waste heat quantity. The retard quantity of the intake valve close timing and the "ITAQ" are established according to the required heat quantity, so that the deterioration in fuel economy can be restricted as much as possible.

In the above embodiment, the intake valve close timing is retarded relative to the intake bottom dead center in order to ensure the ignition advance margin. Alternatively, the intake valve close timing can be advanced relative to the intake bottom dead center in order to ensure the ignition advance margin. Even in this case, the actual compression ratio can be decreased so that the antiknock property can be improved. Thus, the ignition timing can be more advanced relative to the MBT timing. In a case that the intake valve close timing is advanced relative to the intake bottom dead center, the actual compression ratio is decreased to improve the antiknock property. Further, the intake air is expanded after the intake valve is closed and the cylinder temperature during the compression stroke is decreased, which improve the antiknock property. That is, according to the above configuration, the ignition advance margin can be ensured by decreasing the actual compression ratio and the cylinder temperature.

What is claimed is:

1. A waste heat controller controlling a waste heat quantity of an engine, waste heat being a combustion energy other than kinetic energy, based on a required heat quantity in response to a heat-utilize requirement, comprising:
   an intake valve control means for controlling an opening period of an intake valve of the engine based on an engine driving condition, wherein the intake valve control means controls the valve opening period of the intake valve by advancing or retarding the valve close timing and the valve open timing of the intake valve while the valve opening period of the intake valve is kept constant;
   an ignition control means for controlling an ignition timing of the engine based on a minimum advance for best torque (MBT) timing at which a highest fuel economy is obtained in a current engine driving condition;
   a margin determination means for determining, based on the current engine driving condition, whether there is an ignition advance margin relative to the minimum advance for best torque (MBT) timing; and
   a waste heat control means for executing
     an actual compression ratio decreasing control in which an actual compression ratio of the engine is decreased by advancing or retarding a valve close timing of the intake valve by the intake valve control means, wherein the actual compression ratio decreasing control is a retard control in which the valve close timing of the intake valve is retarded to decrease the act compression ratio, and
     an ignition timing advance control in which the ignition timing is advanced relative to the minimum advance for best torque (MBT) timing by the ignition control means in order to increase the waste heat quantity, when the margin determination means determines that there is no ignition advance margin relative to the minimum advance for best torque (MBT) timing;
   the waste heat controller further comprising
   a valve overlap control means for controlling a valve overlap period during which a valve opening period of the intake valve and a valve opening period of the exhaust valve overlap with each other, wherein
   based on the engine driving condition, the margin determination means determines whether there is an ignition advance margin relative to the minimum advance for best torque (MBT) timing at a time after the valve overlap period is varied in a case that the valve overlap period is increased by varying a valve opening period of the intake valve, wherein
   when a heat-utilize requirement is generated, when the required waste heat quantity is insufficient at the minimum advance for best torque (MBT) timing it is determined whether an ignition advance margin exists, and wherein
   when the ignition advance margin does not exist, the actual compression ratio is decreased and the ignition advance margin is ensured and the ignition timing is advanced relative to the MBT timing to increase the waste heat quantity.

2. A waste heat controller according to claim 1, wherein the waste heat control means executes a first waste heat increasing control in which the valve close timing of the intake valve is retarded, the actual compression ratio engine is decreased, the ignition timing is advanced and the valve overlap period is increased by varying a valve opening period of the exhaust valve in order to increase the waste heat quantity when the margin determination means determines there is no ignition advance margin, and
   the waste heat control means executes a second waste heat increasing control in which the valve overlap period is increased by varying a valve opening period of the intake valve and the ignition timing is advanced in order to increase the waste heat quantity when the margin determination means determines there is the ignition advance margin.

3. A waste heat controller according to claim 1, wherein the waste heat control means defines a variation quantity in the valve close timing of the intake valve based on the required heat quantity and controls the opening period of the intake valve based on the variation quantity in the valve close timing of the intake valve when the margin determination means determines there is no ignition advance margin.

4. A waste heat controller according to claim 1, wherein when the margin determination means determines that the current engine driving condition is varied from a condition where there is no ignition advance margin to another condition where there is the ignition advance margin, the valve opening timing of the exhaust valve is advanced before the valve opening timing of the intake valve is advanced.

5. A waste heat controller according to claim 1, wherein the waste heat warms an interior of the vehicle and a catalyst.

* * * * *